US007981490B1

(12) United States Patent
Turner

(10) Patent No.: US 7,981,490 B1
(45) Date of Patent: Jul. 19, 2011

(54) ASSEMBLY AND METHOD OF SCULPTURAL PRESENTATION OF EPIDERMAL SURFACES

(76) Inventor: Wendell Turner, Andover, KS (US)

( * ) Notice: Subject to any disclaimer, the term of this patent is extended or adjusted under 35 U.S.C. 154(b) by 1063 days.

(21) Appl. No.: 11/735,294

(22) Filed: Apr. 13, 2007

(51) Int. Cl.
*A01N 1/00* (2006.01)
*A41G 1/00* (2006.01)
*A47G 35/00* (2006.01)

(52) U.S. Cl. .......................... 428/19; 428/27; 428/542.2

(58) Field of Classification Search ........................ None
See application file for complete search history.

(56) References Cited

U.S. PATENT DOCUMENTS

| | | | | |
|---|---|---|---|---|
| 245,772 | A * | 8/1881 | Boshardt | 428/12 |
| 1,656,310 | A | 1/1928 | Anderson | |
| 2,186,351 | A | 1/1940 | Stojaneck | |
| 2,251,705 | A | 8/1941 | Gonzalez | |
| 3,829,349 | A | 8/1974 | Hermanson | |
| 5,085,900 | A | 2/1992 | Hamlett | |
| 5,213,855 | A | 5/1993 | Buxton | |
| 5,340,622 | A | 8/1994 | Curitti | |
| 5,629,057 | A | 5/1997 | Wang et al. | |
| D413,001 | S | 8/1999 | Nowosielski | |
| 6,089,658 | A | 7/2000 | Law | |
| 6,224,953 | B1 | 5/2001 | Johnson | |
| 6,286,266 | B1 | 9/2001 | Popowych et al. | |
| 6,343,440 | B1 | 2/2002 | Ayers | |
| D477,546 | S | 7/2003 | Como | |
| 6,596,353 | B1 | 7/2003 | Turner | |
| 7,097,889 | B1 | 8/2006 | Carroll | |
| 7,118,788 | B1 | 10/2006 | Turner | |
| 2002/0112825 | A1 * | 8/2002 | Woodring | 160/168.1 R |
| 2004/0001923 | A1 | 1/2004 | Kao | |
| 2004/0197221 | A1 * | 10/2004 | Stanley, III | 422/5 |

* cited by examiner

*Primary Examiner* — Gordon R Baldwin
(74) *Attorney, Agent, or Firm* — Kenneth H. Jack; Davis & Jack, L.L.C.

(57) ABSTRACT

An assembly and method for sculptural presentation of plant or animal epidermal surfaces, the assembly incorporating a multiplicity of scallops and a multiplicity of links interconnecting the scallops in a laterally extending series or band, the multiplicity of links being manipulated to extend the multiplicity of scallops in a "clinker-built" configuration; the multiplicity links being further manipulated to extend the multiplicity of scallops helically; a plurality of links among the multiplicity of links being further manipulated to flare or counter-flare a plurality of the scallops; a second plurality of links among the multiplicity of links being further manipulated to corrugate a second plurality of the scallops.

13 Claims, 9 Drawing Sheets

ASSEMBLY AND METHOD OF SCULPTURAL PRESENTATION OF EPIDERMAL SURFACES

FIELD OF THE INVENTION

This invention relates to assemblies and methods for sculptural depictions and presentations of epidermal or skin textures found in plants and animals in nature. More particularly, this invention relates to such assemblies and methods for sculptural depictions and presentations which are intended to portray in three dimensions such epidermal surfaces which include intermittent sulci and ridges, annularly extending ridges, lines, scars, scales, leaf and stem scars arrayed in the manner of scales, flared or counter-flared surfaces, or various combinations of such surface features.

BACKGROUND OF THE INVENTION

Animal or plant epidermal surfaces which include features such as scales or scutes, leaf and stem scars arrayed in the manner of scales, annularly extending leaf scars, intermittent longitudinally extending sulci and ridges, ribs, or spines, or flared and counter-flared sections are often difficult to sculpturally or three dimensionally present.

Such plant or animal epidermal structures and features are commonly found upon the torsos of fish which commonly include an overlapping longitudinally offset array of scales in combination with longitudinally extending lines. Such structures and features are also found upon the torsos of crocodiles, alligators, and other reptiles which commonly include arrays of scales or scutes in combination with intermittent longitudinally extending sulci or grooves and ribs or spines. Such epidermal characteristics are also commonly found upon snake epidermes which commonly present scales in combination with annularly extending or longitudinally extending lines. Such epidermal characteristics are also found upon columnar varieties cacti which commonly present intermittent sulci and ribs and annular scar lines. Various species of palm trees such as date palms similarly present arrays of leaf or rachis scars. Coconut palms similarly present annularly extending leaf or rachis scars and other palm species further present longitudinally extending alternating sulci and ridges.

Complicated plant and animal epidermal structures described above typically further present flared or counter-flared sections, such sections intermittently increasing or decreasing the diameter of the animal's or plant's trunk, torso, stem or branch, as applicable. Numerous other types of plants and animals found in nature have epidermes which have or suggest scales, have intermittent sulci and ridges, annular lines, longitudinal lines, flared sections or counter-flared sections, or combinations of such features.

Where a plant or animal has an epidermis which includes characteristics such as are discussed above, such plant or animal is typically difficultly sculpturally depicted or portrayed. For example, an animal epidermal surface which includes a flared section, a counter-flared section, an array of scales and intermittent longitudinally extending sulci and ridges typically requires extensive manual labor and materials to sculpt. Plant epidermes including such features are similarly difficult to sculpt.

The instant inventive assembly and method for sculptural presentation of epidermal surfaces solves or ameliorates animal and plant epidermes sculpting problems and difficulties discussed above by providing a specialized band structure and extension, along with assembly method steps which promote time, labor, and materials economy.

BRIEF SUMMARY OF THE INVENTION

The instant inventive assembly for sculptural presentation of epidermal surfaces preferably comprises a multiplicity of scallops and a multiplicity of links which are preferably arranged in an alternating series, the links extending the scallops in a clinker-built or overlapped configuration.

In a preferred configuration of the instant inventive assembly, the multiplicity of links which extend the multiplicity of scallops in the clinker-built or overlapped configuration preferably further extend the multiplicity of scallops along a helical or spiral path in either the right-handed or the left-handed direction. Also in such preferred embodiment, at least a plurality of links among the multiplicity of links extend, in a second further extension, at least a plurality of scallops among the multiplicity of scallops. Such second further extension either flares such plurality of scallops to outwardly expand the sculpted epidermis or counter-flares the plurality of scallops to inwardly contract the sculpted epidermis. Where the entirety of the epidermal surface which is sculpturally depicted constitutes flaring and/or counter-flaring sections, such plurality of scallops may suitably comprise substantially all scallops among the multiplicity of scallops. Alternatively, where the epidermal surface to be depicted includes flaring or counter-flaring sections only at portions of the overall sculpturally depicted surface, such plurality of scallops suitably constitutes a subseries of scallops among the overall multiplicity of scallops.

Also in the preferred embodiment of the instant inventive assembly, at least a second plurality of links among the multiplicity of links extend, in a third further extension, at least a second plurality of scallops among the multiplicity of scallops. Such third further extension preferably corrugates the sculpted epidermis, forming an alternating series of ridges and valleys. Such corrugating extensions of the scallops advantageously portray animal or plant epidermal surfaces which present either longitudinally extending lines or annularly intermittent longitudinally extending ridges and sulci. Where the plant or animal epidermal surface which is sculpturally presented by the instant inventive assembly substantially totally comprises a corrugated texture including intermittent sulci and ridges, the at least second plurality of scallops may suitably comprise substantially all scallops among the multiplicity of scallops. Alternatively, where only a portion of such epidermal surface is longitudinally lined or ridged, the at least second plurality of scallops may suitably comprise only a portion of scallops among the multiplicity of scallops.

Each scallop among the multiplicity of scallops preferably has a longitudinal end, each of the scallops' longitudinal ends comprising an edge surface selected from the group consisting of convex surfaces, concave surfaces, faceted surfaces, angled surfaces, flat surfaces, "sawtooth" surfaces, and "S" curved surfaces. Such variability in the scallops' longitudinal end surface characteristics allows the inventive assembly and method to effectively portray a wide variety of epidermal surface features of various animals and plants found in nature.

In the preferred embodiment of the instant inventive assembly, each of the scallops among the multiplicity of scallops preferably comprises a sheet metal plate, and each of the links among the multiplicity of links which span between and bendably allows the inventive assembly and method to extend the scallops comprises a sheet metal tie. Where such ties are provided, such ties are preferably positioned and wholly formed with the scallops so that each tie spans between and interconnects a pair of the scallops' longitudinally opposite ends. In order to best facilitate the links' further extension, second further extension, and/or third further extension of the scallops (as described above), the metal tie between each pair of scallops is preferably ductilely deformable, allowing malleable and substantially permanent bending at such links. For example, where the metal ties include bends in the nature of the second further extension, plate splaying or plate counter-splaying deflections are preferably imposed at the plurality of links' metal ties. Alternatively or additionally, where the second plurality of links include hands which extend the second plurality of scallops in the manner of the third further extension (i.e., the surface corrugating extension), alternate flexing and counter-flexing deflections are preferably imposed at the second plurality of links' metal ties.

A final structure which is preferably incorporated into the instant inventive assembly preferably comprises an attaching means which rigidly interconnects the spiral turns of the scallops' preferred helical extension, such attaching means fixing the scallops in their sculptural portrayal of the desired plant or animal epidermal surface. Where the scallops constitute the preferred metal plates, the attaching means preferably comprises a multiplicity of welds. Where the attaching means comprises welds, such welds may be advantageously sculpturally positioned upon overlapped junctures between overlying and underlying scallops to further portray epidermal features such as spines, needles, hooks, or stems.

According to the method of the instant invention, the preferred metal plate scallops and their interlinking preferred metal ties are preferably provided in the form of a laterally elongated metal band, such band having a longitudinally opposite end, and having a longitudinal length extending from the band's longitudinal end to the band's longitudinally opposite end. Such band preferably comprises a multiplicity of flaring notches, each flaring notch preferably extending from the band's longitudinal end toward the band's longitudinally opposite end. Preferably, the longitudinally opposite end of each of the flaring notches terminates at a point between ⅜ inch and ½ inch short of the longitudinally opposite end of the band. Portions of the metal band longitudinally residing between the band's longitudinally opposite end and the longitudinally opposite ends of the flaring notches advantageously function as wholly formed links or ties, the ties laterally interlinking in series of pairs of the metal plate scallops.

According to the method of the instant invention, the metal ties which span between the scallops may be manipulated to extend the series of scallops along a spirally turning helical path and in the longitudinally opposite direction. In order to facilitate a desirable "clinker-built" or overlapped configuration of the scallops, the links are preferably further extended so that the pitch of such helical path is less than the band's longitudinal length.

In the event that the plant or animal epidermal surface which is to be sculpturally portrayed includes either a radius of curvature increasing flared section or a radius of curvature decreasing counter-flared section, multiple scallop plate splaying or counter-splaying bends may be manually imposed upon the band at the flaring notches and within the links which are at the longitudinally opposite ends of the flaring notches. Such splaying and counter-splaying bends effectively decrease or increase the surface's radius of curvature. In a like fashion, bends imposed upon series of links in alternating flexed and counter-flexed directions advantageously causes the inventive assembly's metal plate scallops to portray a corrugated epidermal surface.

Accordingly, it is an object of the instant invention to provide an assembly for sculptural presentation of plant or animal epidermal surfaces which incorporates a multiplicity of scallop plates and a multiplicity of links interconnecting such plates wherein the links are arranged to extend the scallop plates in a clinker-built configuration.

It is a further object of the instant invention to provide such an assembly which further helically extends the scallop plates.

It is a further object of the instant invention to provide such an assembly which further provides for flaring and counter-flaring extensions of the scallop plates and the epidermal surface they portray and provides alternating flexed and counter-flexed extensions for corrugating the scallop plates and the epidermal surface they portray.

It is a further object of the instant invention to provide method steps for sculpturally presenting plant or animal epidermal surfaces wherein a notched band may helically wound, may be bent to include flaring and counter-flaring deflections, and may include flexed and counter-flexed deflections for sculpturally portraying flared, counter-flared, and corrugated epidermal surfaces.

Other and further objects, benefits, and advantages of the present invention will become known to those skilled in the art upon review of the Detailed Description of a preferred embodiment which follows, and upon further review of the appended drawings.

DETAILED DESCRIPTION OF A PREFERRED EMBODIMENT

Figure 1:
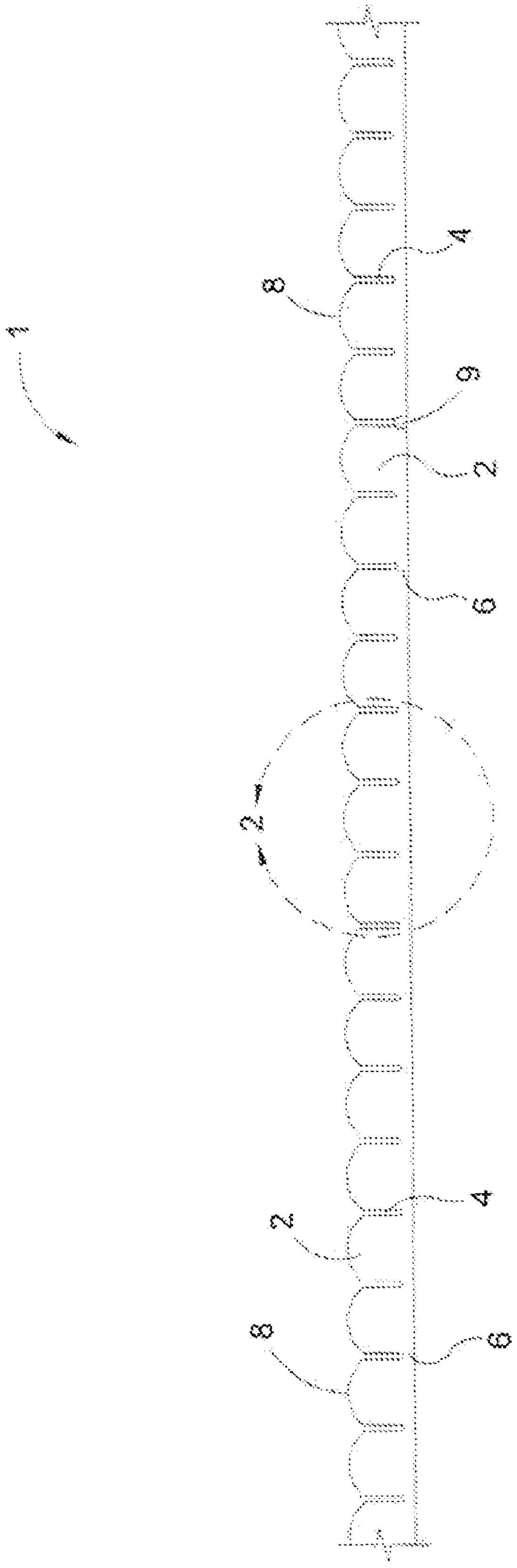
FIG. 1 is a plan view of a portion of the band element of the instant inventive assembly.
Figure 2:
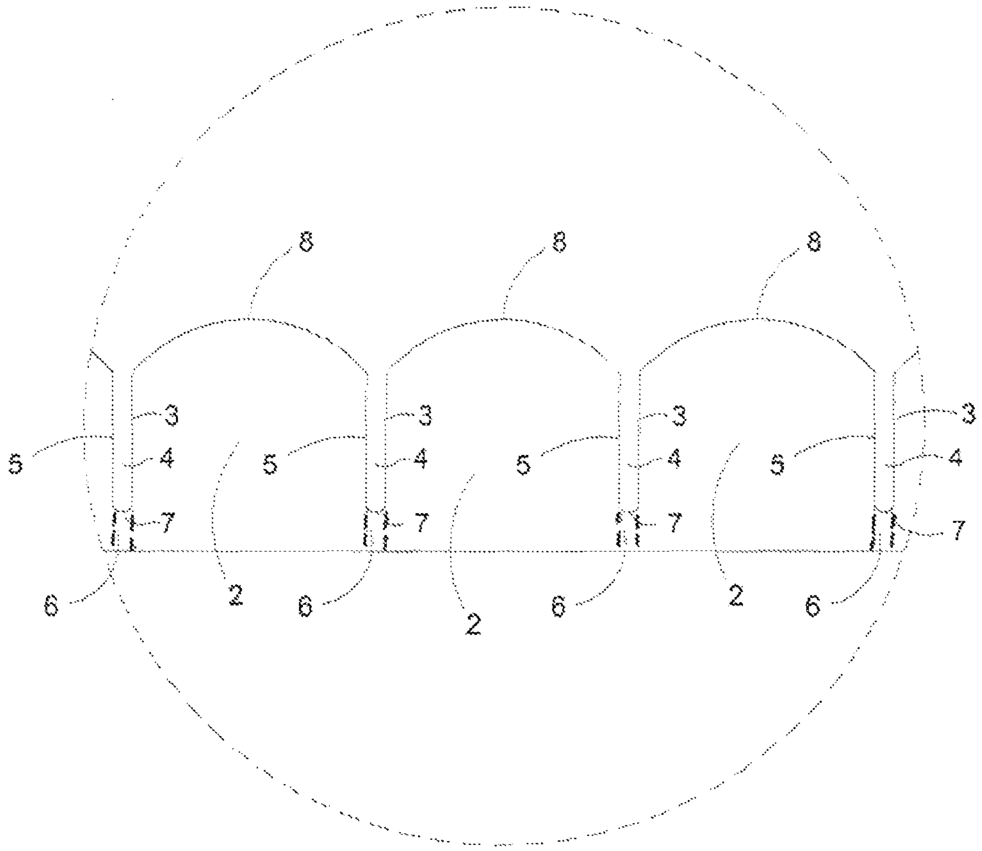
FIG. 2 is a magnified view of a portion of the view of FIG. 1.

Referring now to the drawings, and in particular to FIG. 1, the band component which is provided in accordance with the instant inventive assembly and method is referred to generally by Reference Arrow 1. The band 1 preferably comprises a laterally oblongated strip of ductilely deformable sheet metal, preferably sheet steel. The band 1 preferably is configured to include a multiplicity of scallops 2, pairs of the scallops 2 being laterally interconnected at their longitudinally opposite ends by wholly formed metal links or tie sections 6. Referring further simultaneously to FIG. 2, such wholly formed metal links or tie sections 6 a representationally delineated by paired longitudinally extending dashed lines.

Referring further simultaneously to FIGS. 1 and 2, the metal band is preferably formed by means of laser cutting of edges, "oxi-fuel" cutting of edges, plasma cutter cutting of edges, or water jet cutting of edges. A most preferred edge surface is produced via plasma cutting. Such edge cutting preferably creates within the band 1 and between each pair of scallops 2 a longitudinally oppositely extending flaring notch 4, each such notch having lateral and laterally opposite side edges 3 and 5, and each such notch having a longitudinally opposite end 7. The desired continuous character of the band 1 may be facilitated by lateral end welds 9, such welds allowing relatively short band segments to combine to form a long continuous band.

Figure 3:
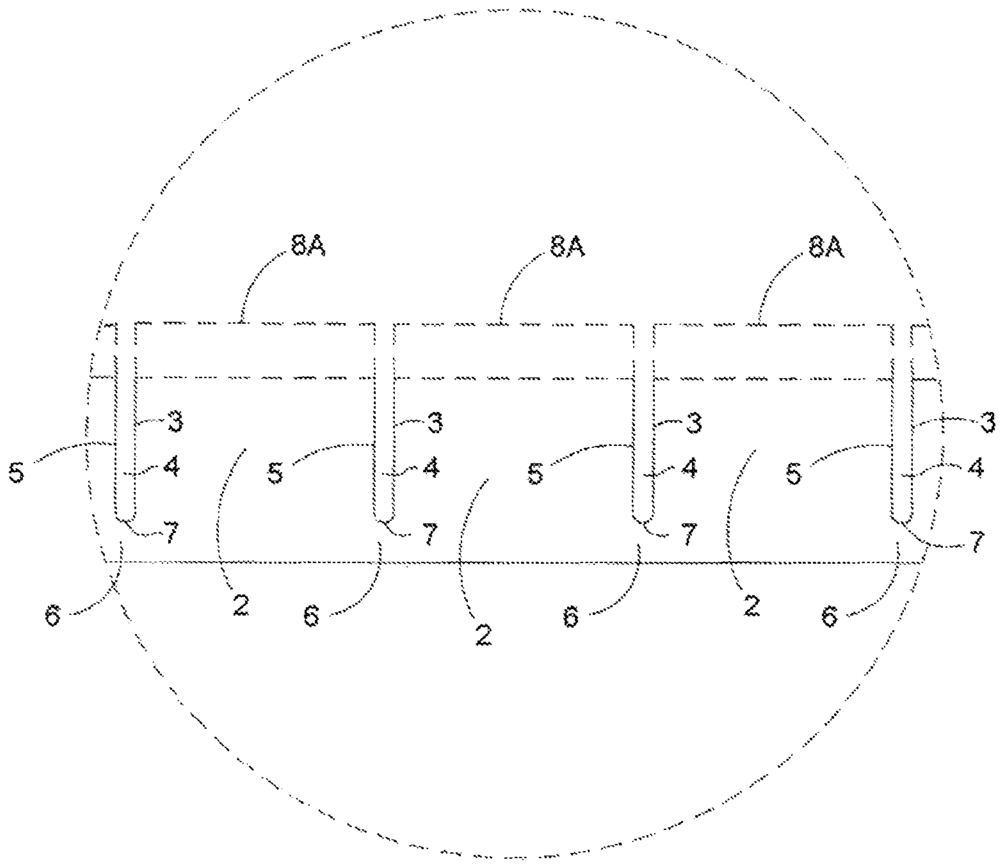
FIG. 3 redepicts FIG. 2, the view of FIG. 3 replacing a portion of the structure with representational dashed line boxes.

Referring to FIG. 2, the longitudinal edge surfaces 8 of the scallops 2 are convex. Referring further simultaneously to FIG. 3, such convex surfaces 8 are replaced by representational boxes 8A, such boxes alternatively representing concave surfaces, faceted surfaces, angled surfaces, flat surfaces, "saw-toothed" surfaces, or S-curved surfaces. Manipulation of the cutting means to produce such scallop longitudinal edge surfaces advantageously allows for variability in portrayal of differing plant or animal epidermal surface textures.

Figure 4:
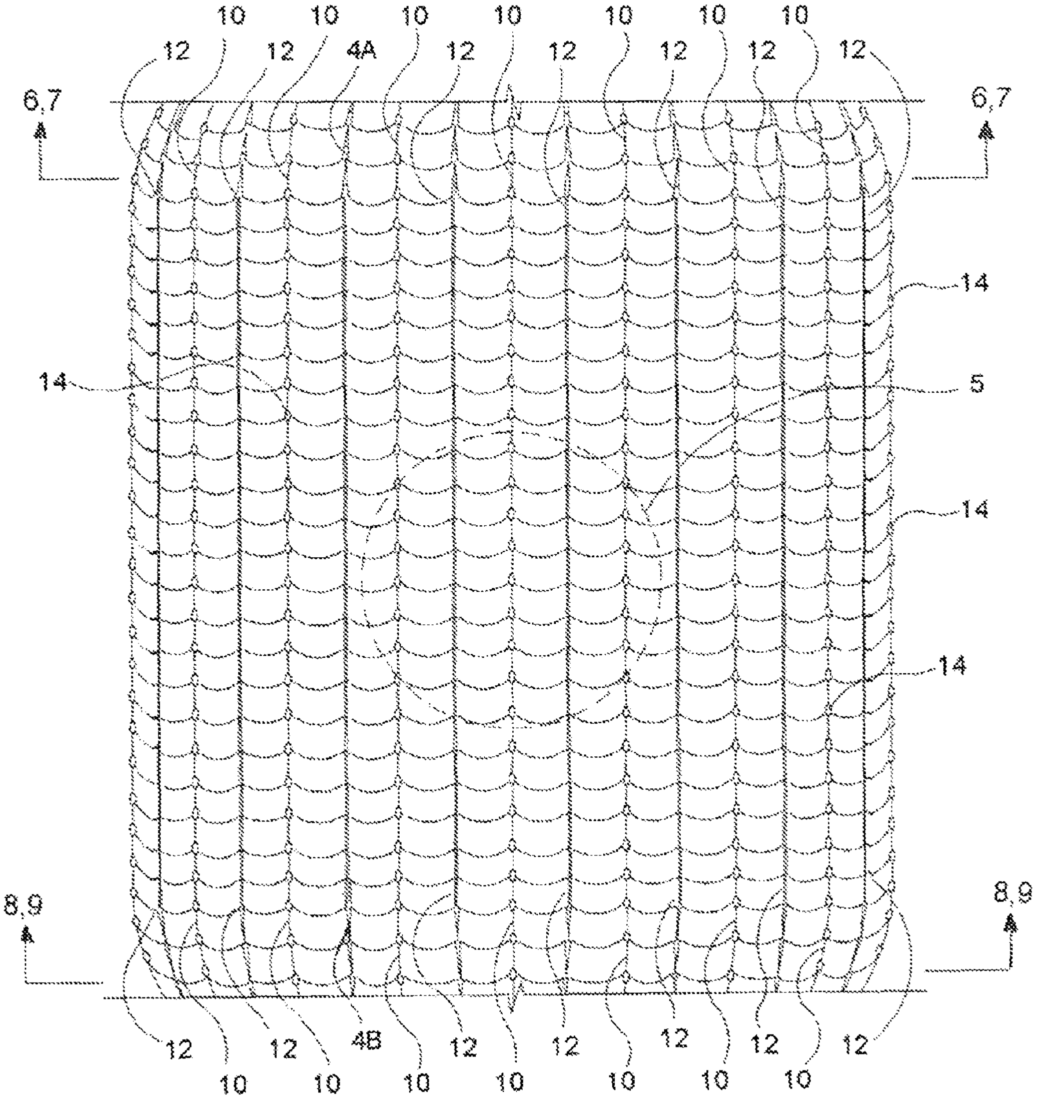
FIG. 4 is a side view of an exemplary plant or animal epidermis constructed in accordance with the instant inventive assembly and method.
Figure 5:
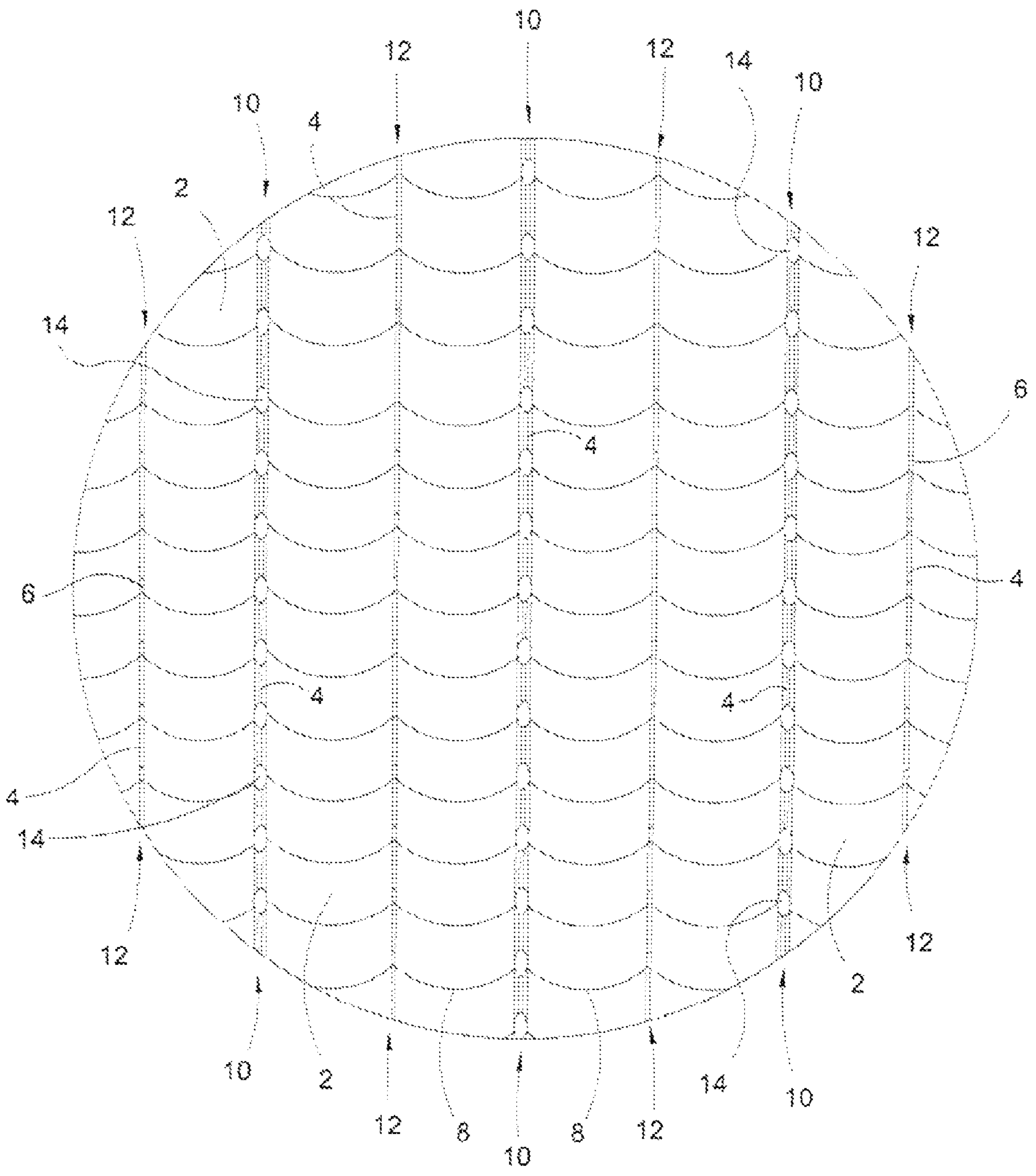
FIG. 5 is a magnified view of a portion of the view of FIG. 4.

Referring simultaneously to FIGS. 1, 2, and 4, a continuous band configured substantially identically with band 1 may be manipulated so that the links 6 extend the band's scallops along a spiral or helical path as indicated in FIG. 4, and in the longitudinally opposite direction (i.e., the upward direction according to the view of FIG. 4). Referring further simultaneously to FIG. 5, it can be seen that each of the scallops 2 overlies a scallop of a prior helical turn and underlies a scallop of a subsequent helical turn. Such underlying and overlying stacking of the scallops configures the sculpted epidermal surface in a "clinker-built" fashion which effectively portrays plant and animal surfaces which include annular lines and/or scales. In order to produce such a "clinker-built" overlapped configuration, it is preferred that the pitch of the helical path of the band 1 be less than the band's longitudinal dimension.

Referring simultaneously to FIGS. 4 and 5, it can be seen that the portion of the plant or animal epidermis depicted in FIG. 4 which is magnified in FIG. 5 has a constant radius of curvature and is neither flared nor counter-flared. Referring further simultaneously to FIG. 2, it can be seen that the angular orientation of the lateral edges of the flaring notches 4 depicted in FIG. 5 are identical to their orientations depicted in FIG. 2, such identity of orientations indicating that no flaring or counter-flaring bends have been imposed at the links 6 within the epidermal section represented by FIG. 5. Accordingly, the constant radius of curvature represented by the epidermis section of FIG. 5 may be advantageously produced by refraining of imposing flaring and counter-flaring bends at links 6.

Figure 6:
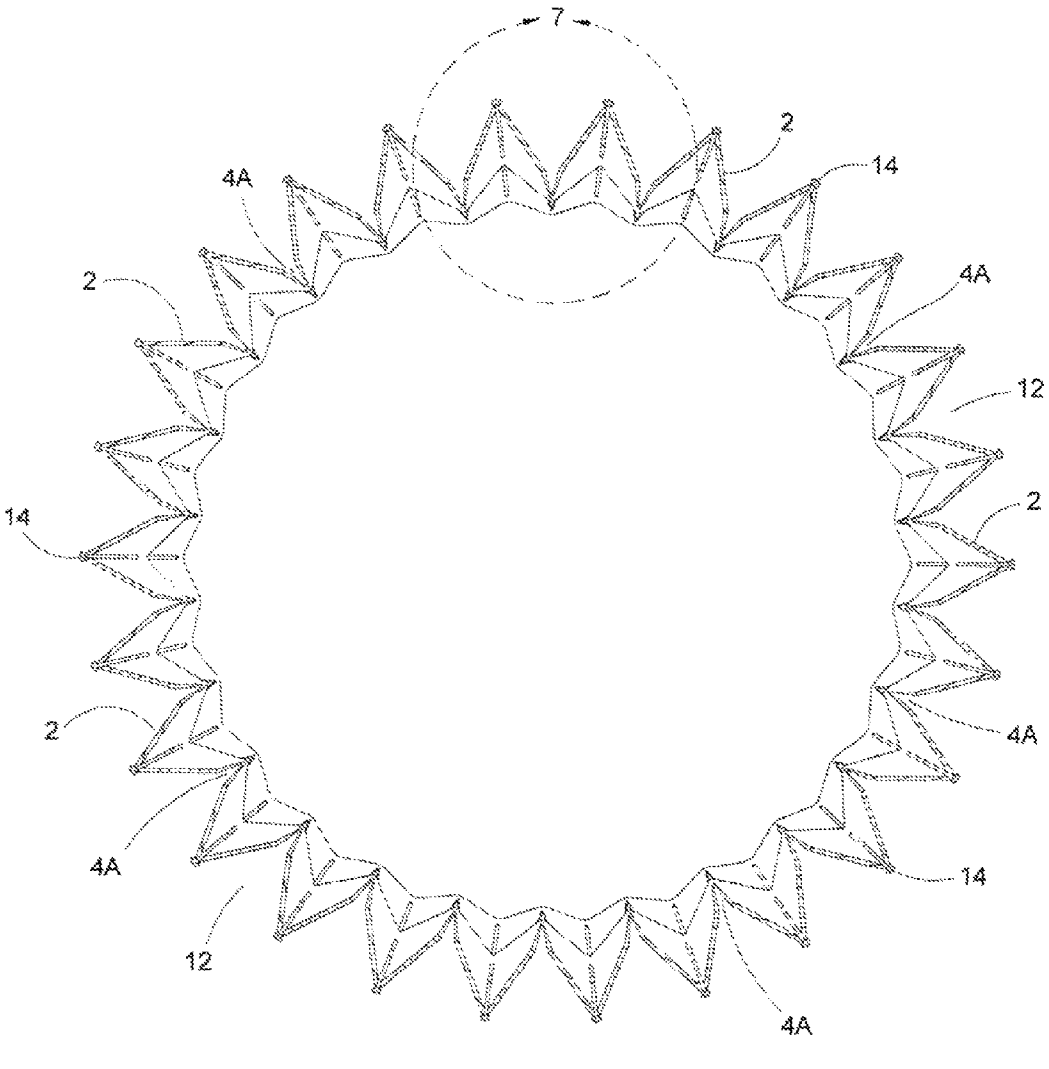
FIG. 6 is a sectional view as indicated in FIG. 4.
Figure 7:
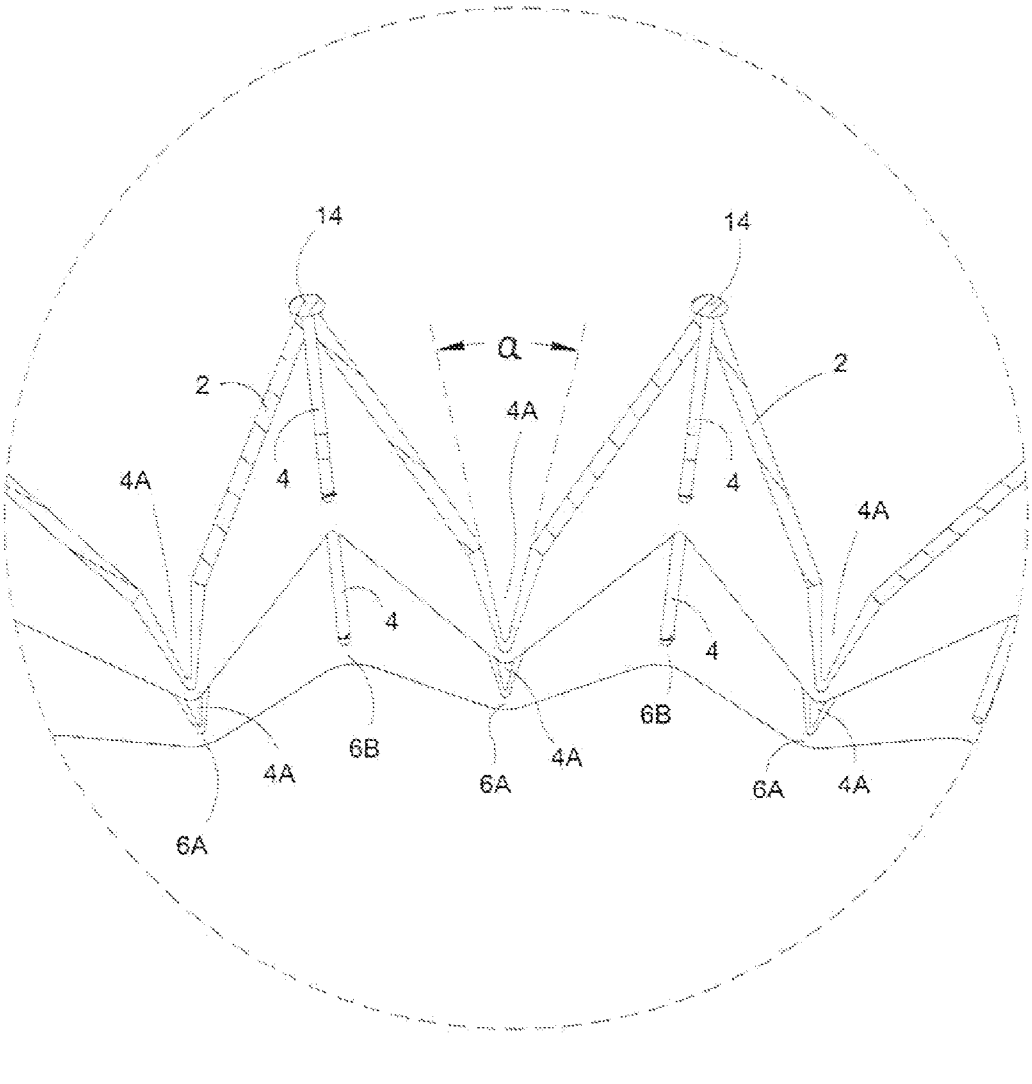
FIG. 7 is a magnified view of a portion of the view of FIG. 6.
Figure 8:
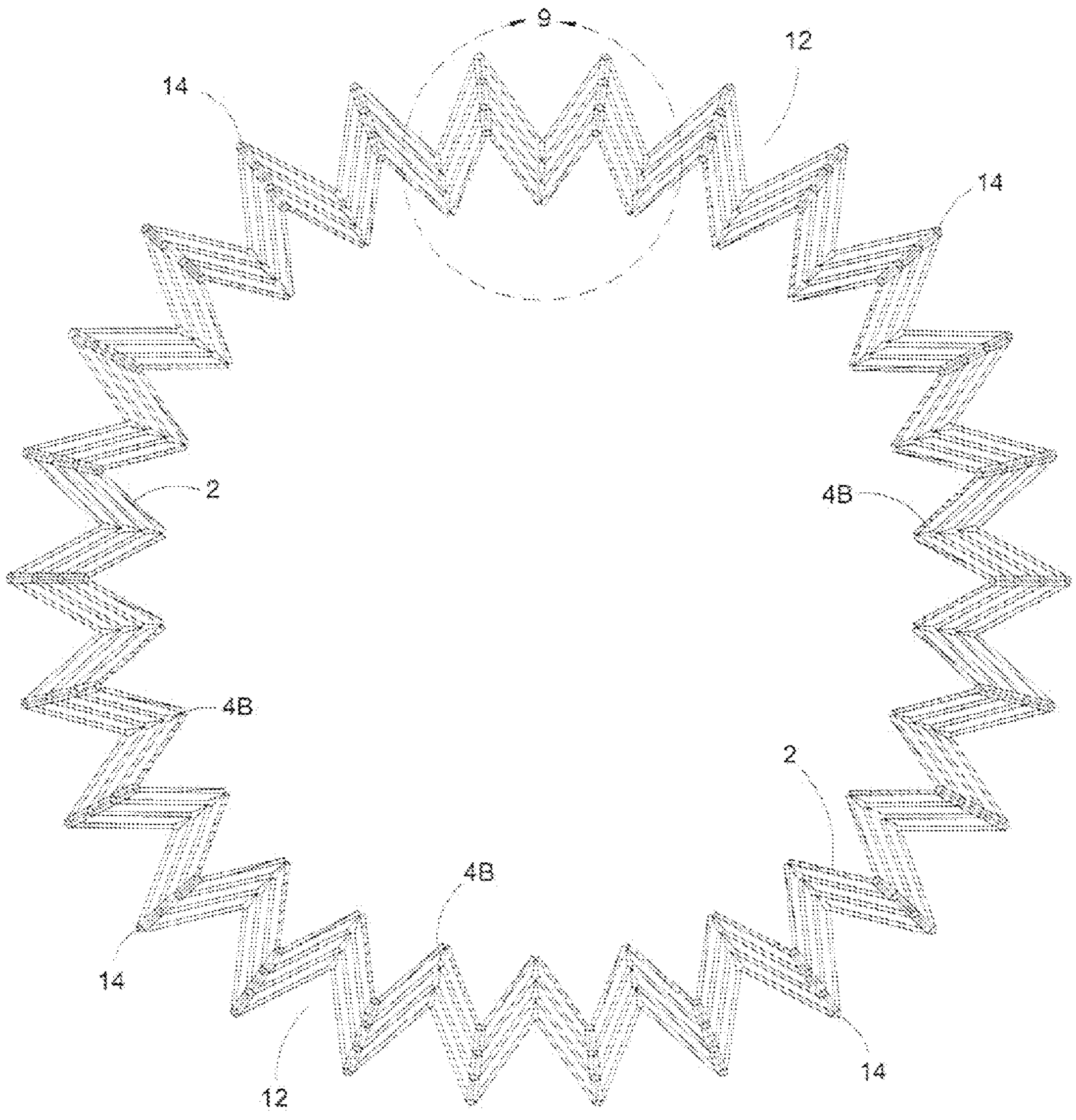
FIG. 8 is a sectional view as indicated in FIG. 4.
Figure 9:
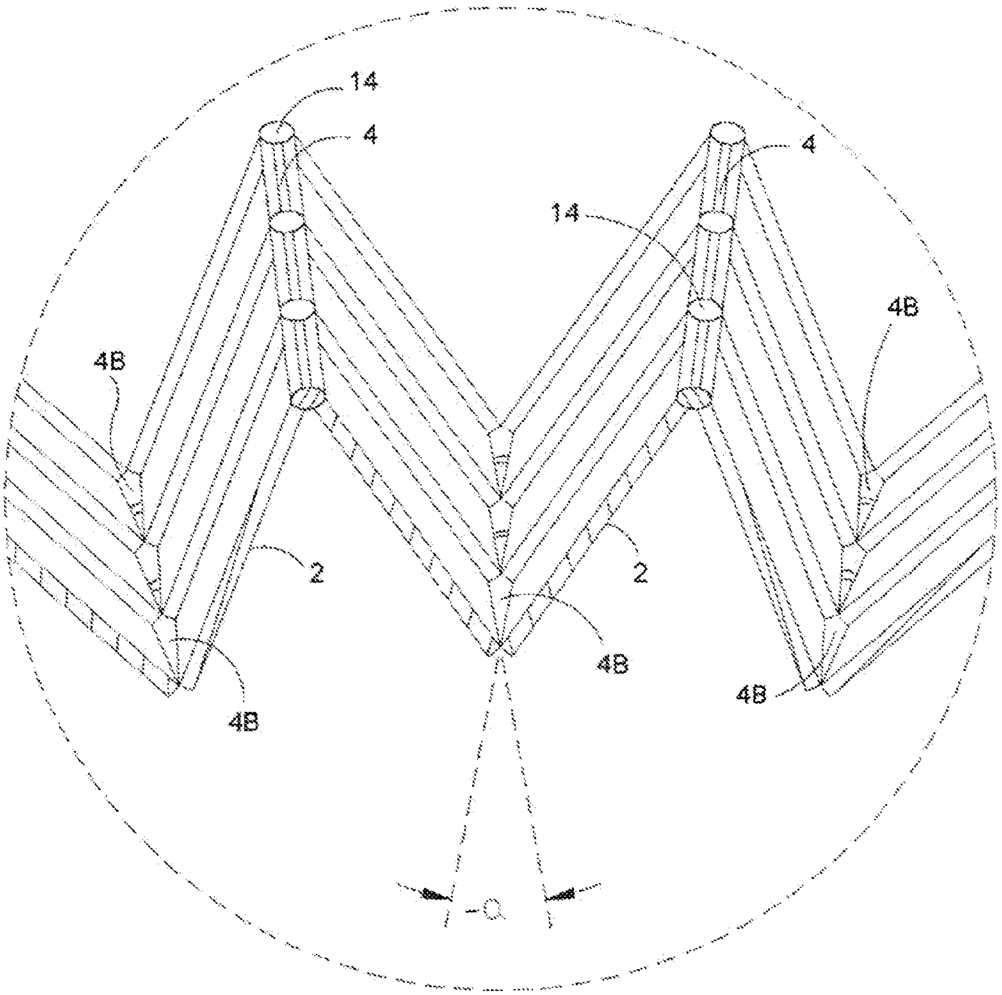
FIG. 9 is a magnified view of a portion of the view of FIG. 8.

In contrast, referring simultaneously to FIGS. 1, 2, 4, 6, and 7, it can be seen that the section of the depicted epidermal surface which extends longitudinally oppositely from the FIG. 6 section line, progressively decreases its radius of curvature, contracting the epidermal surface. Such contracted surface may be advantageously sculpted by flaring every other flaring notch to a flared angle "a", such angularly altered flaring notches being represented by Reference Numerals 4A. Alternatively, referring further simultaneously to FIGS. 8 and 9 an increase in the radius of curvature of, or expansion of the sculpted epidermal surface may be created by imposing counter-flaring bends upon every other flaring notch, such bends being represented by Reference Numerals 4B at angles equivalent to "–a".

Referring simultaneously to FIGS. 4-9, it can be seen that the structurally depicted epidermal surface appears to be corrugated, including an alternating series of longitudinally extending ridges and valleys, reference numerals 10 representing the ridges and reference numerals 12 representing the valleys. Such corrugated or alternating ridge and valley appearance may be advantageously created by imposing alternating flexing and counter-flexing bends upon the links 6 between the scallops 2. Reference Numerals 6A are representative of flexing bends which produce valleys 12 or sulci features within the sculpted epidermal surfaces, and Reference Numerals 6B are representative of counter-flexing bends which produce longitudinally extending ridges 10.

Referring simultaneously to all figures, manipulation of the links 6 to impose the various and differing extensions of scallop plates 2 in their "clinker-built", helically extending, flared, counter-flared, flexed, and counter-flexed extensions, economically and conveniently, and with a minimum of labor, sculpturally presents a multiplicity of types of plant and animal epidermal surfaces.

In order to affix the sculpted epidermal surface in a rigid form, a multiplicity of welds 14 are utilized to interconnect the turns or helical windings of the band 1.

While the principles of the invention have been made clear in the above illustrative embodiment, those skilled in the art may make modifications in the structure, arrangement, portions, components, and method steps of the invention without departing from those principles. Accordingly, it is intended that the description and drawings be interpreted as illustrative and not in the limiting sense, and that the invention be given a scope commensurate with the appended claims.

I claim:

1. An assembly for sculptural presentation of epidermal surfaces, the assembly comprising:

(a) a multiplicity of scallops, each scallop among the multiplicity of scallops having inner and outer surfaces; and (b) a multiplicity of links, the links extending the scallops in a clinker-built configuration wherein each scallop's inner surface abuts the outer surface of one of the other scallops.

2. The assembly of claim 1 wherein the multiplicity of links helically extend the multiplicity of scallops.

3. The assembly of claim 2 wherein a plurality of links among the multiplicity of links flare a plurality of scallops among the multiplicity of scallops, or wherein said plurality of links counter flare said plurality of scallops.

4. The assembly of claim 3 wherein a second plurality of links among the multiplicity of links corrugate a second plurality of scallops among the multiplicity of scallops.

5. The assembly of claim 4 wherein each scallop among the multiplicity of scallops has a longitudinal end, each of the scallops' longitudinal ends comprising an edge surface selected from the group consisting of convex surfaces, concave surfaces, faceted surfaces, angled surfaces, flat surfaces, "saw toothed" surfaces, and S-curved surfaces.

6. The assembly of claim 5 wherein each scallop among the multiplicity of scallops comprises a metal plate, and wherein each link among the multiplicity of links comprises a metal tie.

7. The assembly of claim 6 wherein each scallop among the multiplicity of scallops has a longitudinally opposite end, and wherein the metal tie of each link among the multiplicity of links spans between and interconnects an adjacent pair of said scallops' longitudinally opposite ends.

8. The assembly of claim 7 wherein the metal tie of each link among the multiplicity of links is ductily deformable, and wherein the second further extension comprises plate splaying or plate counter-splaying bends at the plurality of links' metal ties.

9. The assembly of claim 8 wherein the links' corrugation comprises plate flexing or counter-flexing bends at the second plurality of links' metal ties.

10. The assembly of claim 6 wherein each metal tie among a multiplicity of the metal ties is formed wholly with a pair of the scallops' metal plates.

11. The assembly of claim 10 wherein each metal tie and metal plates whole formation comprises a peripheral edge selected from the group consisting of die cut edges, shear cut edges, laser cut edges, "oxy fuel" cut edges, plasma cutter formed edges, and water jet formed edges.

12. The assembly of claim 2 wherein the multiplicity of scallops' extension comprises a plurality of spiral turns, and further comprising attaching means fixedly interconnecting the spiral turns.

13. The assembly of claim 12 wherein the attaching means comprises a multiplicity of welds.

* * * * *